(12) United States Patent
Grigat et al.

(10) Patent No.: US 6,307,003 B1
(45) Date of Patent: *Oct. 23, 2001

(54) COMPOSTABLE ADHESIVE

(75) Inventors: Ernst Grigat, Leverkusen; Karsten-Josef Idel, Krefeld; Uwe Westeppe, Remscheid; Wolfgang Schulz-Schlitte, Langenfeld; Winfried Pommeranz, Enger; Jürgen Lörcks, Rees; Harald Schmidt, Emmerich, all of (DE)

(73) Assignees: Bayer AG, Leverkusen; Biotec Biologische, Emmerich, both of (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/171,383
(22) PCT Filed: Apr. 7, 1997
(86) PCT No.: PCT/EP97/01722
    § 371 Date: Mar. 15, 1999
    § 102(e) Date: Mar. 15, 1999
(87) PCT Pub. No.: WO97/40114
    PCT Pub. Date: Oct. 30, 1997

(30) Foreign Application Priority Data

Apr. 18, 1996 (DE) .............................. 196 15 151

(51) Int. Cl.$^7$ ...................................... C08G 64/00
(52) U.S. Cl. .......................... 528/196; 528/198
(58) Field of Search ...................... 528/196, 198

(56) References Cited

U.S. PATENT DOCUMENTS

| | | | |
|---|---|---|---|
| 3,718,518 | 2/1973 | Bock et al. | 156/242 |
| 4,234,305 | 11/1980 | Miyake et al. | 432/59 |
| 4,584,362 | 4/1986 | Leckart et al. | 528/55 |

FOREIGN PATENT DOCUMENTS

| | | |
|---|---|---|
| 4234305 | 11/1980 | (DE) . |
| 1930336 | 1/1971 | (DK) . |
| 0684270 | 11/1995 | (EP) . |
| 08003297 | 1/1996 | (JP) . |

OTHER PUBLICATIONS

Römpp Chemielexikon, 9th Edition, Thieme Verlag 1990: "Adhesives" heading.

Primary Examiner—Terressa M. Boykin
(74) Attorney, Agent, or Firm—Connolly Bove Lodge & Hutz LLP

(57) ABSTRACT

The present invention relates to a compostable adhesive, to a method of producing the same, and to the use of the adhesive for the adhesive bonding of materials.

11 Claims, No Drawings

COMPOSTABLE ADHESIVE

The present invention relates to a compostable adhesive, to a method of producing the same, and to the use of the adhesive for the adhesive bonding of materials.

Adhesives as such have long been known (see Römpp Chenielexikon, 9 th Edition, Thieme Verlag 1990: "Adhesives" heading). It is precisely the use of synthetic polymers which has significantly extended the development of adhesives. However, one disadvantage of adhesive polymers which have been used hitherto, particularly after the adhesive bonding operation, is the lack of biodegradability of the adhesive bond. The amounts of adhesives on substrates to be adhesively bonded are in fact mostly small, but the requirement of complete biodegradability also makes it necessary for adhesives to be completely biodegraded. Glues or pastes based on natural substances, e.g. starch pastes, are in fact degradable provided that they do not contain any adjuvant substances which are not completely degradable, but are only of very limited suitability for industrial adhesive bonding operations, due to their poor bonding to many substrates.

The object of the present invention was therefore to develop a completely biodegradable adhesive bonding system which is both capable of being used industrially and which satisfies the requirement of completely biodegradability.

This object has been achieved by dissolving completely degradable polymers in suitable solvents and using this solution for the adhesive bonding of parts. This adhesive bonding system bonds due to the volatilisation of the solvent and the precipitation or crystallisation of the polymers in the substrate to be adhesively bonded.

Aliphatic or partially aromatic polyesters, thermoplastic aliphatic or partially aromatic polyester urethanes, aliphatic or aliphatic-aromatic polyester carbonates and aliphatic polyester amides are used as biodegradable polymers.

The following polymers are suitable:

Aliphatic or partially aromatic polyesters formed from

A) aliphatic bifunctional alcohols, preferably linear $C_2$–$C_{10}$ dialcohols such as ethanediol, butanediol or hexanediol, most preferably butanediol, and/or optionally cycloaliphatic bifunctional alcohols, preferably those comprising $C_5$–$C_6$ C-atoms in their cycloaliphatic ring such as cyclohexanedimethanol for example, and/or, in part or completely instead of diols, monomeric or oligomeric polyols based on ethylene glycol, propylene glycol, tetrahydrofuran or copolymers thereof with molecular weights up to 4000, daltons preferably up to 1000, daltons and/or optionally small amounts of branched bifunctional alcohols, preferably $C_3$–$C_{12}$ alkyldiols such as neopentyl glycol for example, and optionally small amounts of alcohols of higher functionality in addition, preferably C3–$C_{12}$ alkylpolyols such as 1,2,3-propanetriol or trimethylolpropane for example, and from aliphatic bifunctional acids, preferably $C_2$–$C_{12}$ alkyldicarboxylic acids such as succinic acid or adipic acid for example, which are preferred, and/or optionally from aromatic bifunctional acids such as terephthalic acid or isophthalic acid or naphthalene-dicarboxylic acid for example, and optionally from small amounts of acids of higher functionality in addition, such as trimellitic acid for example, or B) from acid- and alcohol-functionalised components, preferably those comprising 2 to 12 C-atoms in their alkyl chain, for example hydroxybutyric acid or hydroxyvaleric acid or lactic acid, or derivatives thereof, for example ε-caprolactone or a dilactide, or from a mixture and/or a copolymer of A and B, wherein the aromatic acids make up a proportion of not more than 50% by weight with respect to all the acids.

All the acids may also be used in the form of derivatives such as acid chlorides or esters, either as monomeric or as oligomeric esters, for example;

Aliphatic or partially aromatic polyester urethanes formed from

C) aliphatic bifunctional alcohols, preferably linear $C_2$–$C_{10}$ dialcohols such as ethanediol, butanediol or hexanediol, most preferably butanediol, and/or optionally cycloaliphatic bifunctional alcohols, preferably those comprising a $C_5$–$C_6$ cycloaliphatic ring such as cyclohexanedimethanol for example, and/or, in part or completely instead of diols, monomeric or oligomeric polyols based on ethylene glycol, propylene glycol, tetrahydrofuran or copolymers thereof with molecular weights up to 4000, daltons preferably up to 1000, daltons and/or optionally small amounts of branched bifunctional alcohols, preferably $C_3$–$C_{12}$ alkyldiols such as neopentyl glycol for example, and optionally small amounts of alcohols of higher functionality in addition, preferably $C_3$–$C_{12}$ alkylpolyols such as 1,2,3-propanetriol or trimethylolpropane for example, and from aliphatic bifunctional acids, preferably $C_2$–$C_{12}$ alkyldicarboxylic acids such as succinic acid or adipic acid for example, which are preferred, and/or optionally from aromatic bifunctional acids such as terephthalic acid or isophthalic acid or naphthalene-dicarboxylic acid for example, and optionally from small amounts of acids of higher functionality in addition, such as trimellitic acid for example, or D) from acid- and alcohol-functionalised components, preferably those comprising 2 to 12 C-atoms in their alkyl chain, for example hydroxybutyric acid or hydroxyvaleric acid or lactic acid, or derivatives thereof, for example ε-caprolactone or a dilactide, or from a mixture and/or a copolymer of C and D, wherein the aromatic acids make up a proportion of not more than 50% by weight with respect to all the acids.

All the acids may also be used in the form of derivatives such as acid chlorides or esters, either as monomeric or as oligomeric esters, for example;

E) comprising the reaction product of C and/or D with aliphatic and/or cycloaliphatic bifunctional isocyanates and optionally with isocyanates of higher functionality in addition, preferably those comprising 1 to 12 C-atoms or 5 to 8 C-atoms in the case of cycloaliphatic isocyanates, e.g. tetramethylene diisocyanate, hexamethylene diisocyanate or isophorone diisocyanate, optionally in addition with linear and/or branched and/or cycloaliphatic bifunctional alcohols and/or alcohols of higher functionality, preferably $C_3$–$C_{12}$ alkyldiols or polyols or those comprising 5 to 8 C-atoms in the case of cycloaliphatic alcohols, e.g. ethanediol, hexanediol, butanediol or cyclohexane-dimethanol, and/or optionally in addition with linear and/or branched and/or cycloaliphatic bifunctional amines and/or amino alcohols and/or amines and/or amino alcohols of higher functionality, preferably those comprising 2 to 12 C-atoms in their alkyl chain, e.g. ethylenediamine or aminoethanol, and/or optionally with other modified amines or alcohols, such as ethylenediaminoethane sulphonic acid, as the free acid or as a salt, for example, wherein the proportion of esters C) and/or D) is at least 75% by weight with respect to the sum of C), D) and E), and wherein for a polymer synthesis which is typical of that employed for polyurethane, which optionally comprises soft segments C) and D) as well as hard segments E), a completely random distribution of the raw materials within the polymer is not to be expected.

Aliphatic or aliphatic-aromatic polyester carbonates comprising

F) those formed from aliphatic bifunctional alcohols, preferably linear $C_2$–$C_{10}$ dialcohols such as ethanediol, butanediol or hexanediol for example, most preferably butanediol, and/or optionally cycloaliphatic bifunctional alcohols, preferably those comprising 5 to 8 C-atoms in their cycloaliphatic ring, such as cyclohexanedimethanol for example, and/or, in part or completely instead of diols, monomeric or oligomeric polyols based on ethylene glycol, propylene glycol, tetrahydrofuran or copolymers thereof with molecular weights up to 4000, daltons preferably up to 1000, daltons and/or optionally small amounts of branched bifunctional alcohols, preferably $C_3$–$C_{12}$ alkyldiols such as neopentyl glycol for example, and optionally small amounts of alcohols of higher functionality in addition, preferably $C_3$–$C_{12}$ alkylpolyols such as 1,2,3-propanetriol or trimethylolpropane for example, and from aliphatic bifunctional acids, preferably $C2$–$C_{12}$ alkyldicarboxylic acids such as succinic acid or adipic acid for example, which are preferred, and/or optionally from aromatic bifunctional acids such as terephthalic acid or isophthalic acid or naphthalene-dicarboxylic acid for example, and optionally from small amounts of acids of higher functionality in addition, such as trimellitic acid for example, or G) from acid- and alcohol-functionalised components, preferably those comprising 2 to 12 C-atoms in their alkyl chain, for example hydroxybutyric acid or hydroxyvaleric acid or lactic acid, or derivatives thereof, for example ε-caprolactone or a dilactide, or from a mixture and/or a copolymer of F and G, wherein the aromatic acids make up a proportion of not more than 50% by weight with respect to all the acids.

All the acids may also be used in the form of derivatives such as acid chlorides or esters, either as monomeric or as oligomeric esters, for example;

H) a carbo constituent which is produced from aromatic bifunctional phenols, preferably bisphenol A, and carbonate donors, for example phosgene, or a carbonate constituent which is produced from aliphatic esters of carbonic acids or derivatives thereof, such as esters of chlorocarbonic acids for example, or from aliphatic carboxylic acids or derivatives thereof such as salts for example, and carbonate donors, for example phosgene.

The proportion of esters F) and/or G) must be at least 70% by weight with respect to the sum of F), G) and H);

Aliphatic or partially aromatic polyester amides formed from

I) aliphatic bifunctional alcohols, preferably linear $C_2$–$C_{10}$ dialcohols such as ethanediol, butanediol or hexanediol, most preferably butanediol, and/or optionally cycloaliphatic bifunctional alcohols, preferably those comprising 5 to 8 C-atoms such as cyclohexanedimethanol for example, and/or, in part or completely instead of diols, monomeric or oligomeric polyols based on ethylene glycol, propylene glycol, tetrahydrofiran or copolymers thereof with molecular weights up to 4000, daltons preferably up to 1000, daltons and/or optionally small amounts of branched bifunctional alcohols, preferably $C_3$–$C12$ alkyldiols such as neopentyl glycol for example, and optionally small amounts of alcohols of higher functionality in addition, preferably $C_3$–$C_{12}$ alkylpolyols such as 1,2,3-propanetriol or trimethylolpropane for example, and from aliphatic bifunctional acids, preferably those comprising 2 to 12 Catoms in their alkyl chain such as succinic acid or adipic acid for example, which are preferred, and/or optionally from aromatic bifunctional acids such as terephthalic acid or isophthalic acid or naphthalene-dicarboxylic acid for example, and optionally from small amounts of acids of higher functionality in addition, such as trimellitic acid for example, or K) from acid- and alcohol-functionalised components, preferably those comprising 2 to 12 C-atoms in their alkyl chain, for example hydroxybutyric acid or hydroxyvaleric acid or lactic acid, or derivatives thereof, for example ε-caprolactone or a dilactide, or from a mixture and/or a copolymer of I) and K), wherein the aromatic acids make up a proportion of not more than 50% by weight with respect to all the acids.

All the acids may also be used in the form of derivatives such as acid chlorides or esters, either as monomeric or as oligomeric esters, for example;

L) from an amide constituent formed from aliphatic and/or cycloaliphatic bifunctional amines and/or optionally small amounts of branched bifunctional amines, wherein linear aliphatic $C_2$–$C_{10}$ diamines are preferred, and optionally small amounts of amines of higher functionality in addition, wherein hexamethylenediamine and isophoronediamine are preferred as amines and hexamethylenediamine is particularly preferred, and from linear and/or cycloaliphatic bifunctional acids, preferably those comprising 2 to 12 C-atoms in their alkyl chain or those comprising a $C_5$–$C6$ ring in the case of cycloaliphatic acids, preferably adipic acid, and/or optionally small amounts of branched bifunctional acids and/or optionally of aromatic bifunctional acids such as terephthalic acid or isophthalic acid or naphthalene-dicarboxylic acid for example, and optionally small amounts of acids of higher functionality in addition, preferably those comprising 2 to 10 C-atoms, or M) from an amide constituent formed from acid- and amine-functionalised components, preferably those comprising 4 to 20 C-atoms in their cycloaliphatic chain, preferably ω-laurolactam and ε-caprolactam, most preferably ε-caprolactam, or from a mixture of L) and M) as an amide constituent.

The proportion of esters I) and/or K) must be at least 30% by weight with respect to the sum of I), K), L) and M). The proportion by weight of ester structures is preferably between 30 and 70%, and the proportion of amide structures is preferably between 70 and 30%.

Synthesis of the biodegradable polyester amides according to the invention can be effected either by the "polyamide method", by preparing a stoichiometric mixture of the starting components, optionally with the addition of water, and the subsequent removal of water from the reaction mixture, or by the "polyester method", by preparing a stoichiometric mixture of the starting components and by adding an excess of a diol with esterification of the acid groups and the subsequent transesterification or conversion into an amide of these esters. In the second case, the excess diol is also distilled off again in addition to water. Synthesis is preferably effected by the "polyester method" described above.

The polyester, polyester urethanes, polyester carbonates or preferably the polyester amides according to the invention may in addition contain 0.1 to 5% by weight, preferably 0.1 to 1% by weight, of branching agents. Examples of these branching agents include trifunctional alcohols such as trimethylolpropane or glycerol, tetrafunctional alcohols such as pentaerythritol, or trifunctional carboxylic acids such as citric acid. Branching agents increase the melt viscosity of the polyester amides according to the invention by an extent such that extrusion blow-moulding becomes possible with these polymers. The biodegradation of the materials is not thereby impeded.

Furthermore, the condensation polymerisation can be speeded up by the use of known catalysts. It is possible to employ either the known phosphorus compounds which speed up the synthesis of polyamides, or acidic or organometallic esterification catalysts, or combinations of both, in order to speed up the condensation polymerisation process.

It should be ensured that the catalysts do not have a negative effect either on the biodegradability or compostability or on the quality of the resulting compost.

In addition, condensation polymerisation to form polyester amides can be influenced by the use of lysine, lysine derivatives or other products which cause branching of amides, such as aminoethylaminoethanol for example, and which both speed up the condensation and result in branched products (see DE 38 31 709, for example).

The solvents which can be used according to the invention may be alcohols, ketones, ethers, halogenated or halogen-free hydrocarbons or esters. Acetone, ethyl acetate, isopropanol, methanol, dichloromethane, chloroform, tetrahydrofuran, ethanol or toluene are preferred. Ethanol is particularly preferred.

The solvents which can be used according to the invention may also be mixtures of said solvents, and may also be mixtures which include other solvents, such as water for example.

According to the invention, the concentrations of polymer in solution is between 70% by weight and 1% by weight of the polymer constituent, preferably between 50% by weight and 8% by weight of the polymer constituent, most preferably between 40% by weight and 19% by weight of the polymer constituent.

Additional materials such as fillers, or additives such as bonding enhancers or viscosity influencing agents, can also be added to the adhesive solutions according to the invention.

The present invention further relates to a method for the adhesive bonding of compostable materials whilst retaining the compostability of the composite material as a whole, which is characterised in that solutions of compostable adhesives corresponding to the composition according to the invention are used for adhesive bonding.

The present invention also relates to a method for the adhesive bonding of compostable materials whilst retaining the compostability of the composite material as a whole, which is characterised in that the solutions of compostable adhesives which are used for adhesive bonding are prepared in a suitable adhesive bonding apparatus, preferably at temperatures above 60° C., most preferably at temperatures above 70° C., and are used immediately (within a period no longer than 10 minutes) for adhesive bonding. This can be effected batch-wise, but is preferably effected continuously.

The present invention further relates to a method for the adhesive bonding of compostable materials whilst retaining the compostability of the composite material as a whole, which is characterised in that curing of the adhesive bond is speeded up. This can be effected, for example, by physical means such as the accelerated removal of the solvent, under vacuum for example, or by the addition of crystallisation accelerators (nucleating agents).

Also claimed are the finished adhesive bonding locations of completely compostable composite materials which have been joined by the use of the solutions of compostable adhesives according to the invention.

The materials which can be adhesively bonded with the adhesives according to the invention can be leather, ceramics, wood, cardboard, paper or plastics.

The present invention further relates to the use of a solution containing the aforementioned biodegradable polymers as an adhesive.

EXAMPLE 1

20% by weight of a biodegradable polyester amide comprising a proportion of 60% by weight of caprolactam and a proportion of 40% by weight of an ester of adipic acid and butanediol, which had a relative solution viscosity of 2.5 as measured in a 1% by weight solution in meta-cresol at 20° C., was dissolved in 80 g ethanol at 75° C. The solution was used for the adhesive bonding of wood, cardboard, paper and cotton fabric, by applying it with a brush for example.

When paper or cardboard were adhesively bonded, strengths were achieved which were superior to the strength of the materials used. When the mechanical separation behaviour was investigated, it was always the paper or the cardboard which tore, and not the adhesive bonding location.

What is claimed is:

1. A compostable adhesive comprising a solution of 1 to 70% by weight, with respect to the polymer constituent, of biodegradable polymers selected from the group consisting of thermoplastic aliphatic or partially aromatic polyester urethanes, aliphatic or aliphatic-aromatic polyester carbonates and aliphatic or partially aromatic polyester amides, wherein a) the aliphatic or partially aromatic polyester urethanes are prepared by reacting an ester component prepared from starting materials selected from the group consisting of:

A) alcohol components selected from the group consisting of aliphatic bifunctional alcohols; cycloaliphatic bifunctional alcohols; monomeric or oligomeric polyols based on ethylene glycol, propylene glycol, tetrahydrofuran or copolymers thereof with molecular weights up to 4000 daltons and mixtures thereof; and optional small amounts of components selected from the group consisting of branched bifunctional alcohols, higher-functional alcohols and mixtures thereof; and acid components selected from the group consisting of aliphatic bifunctional acids, aromatic bifunctional acids and mixtures thereof; and optional small amounts of higher-functional acids;

B) from units functionalized by both acid and alcohol, their derivatives and mixtures thereof; and combinations of A and B selected from the group consisting of a mixture, a copolymer and a mixture thereof, wherein the aromatic acids make up not more that 50 wt. % of all acids; with C) functional monomers selected from the group consisting of aliphatic bifunctional isocyanates, cycloaliphatic bifunctional isocyanates, and mixtures thereof, optional higher-functional isocyanates;

optional linear, branched or cycloaliphatic bifunctional alcohols; linear, branched or cycloaliphatic higher functional alcohols; and mixtures thereof;

optional linear, branched or cycloaliphatic bifunctional amines; linear, branched or cycloaliphatic higher functional amines and mixtures thereof, optional amino alcohols, higher functional amino alcohols and mixtures thereof; and optional other modified amines or alcohols, wherein the ester component is at least 75 wt. % of the sum of the ester component and C;

b) aliphatic or aliphatic-aromatic polyester carbonates prepared by reacting as starting material, an ester or a mixture thereof as described in (a) with D) a carbonate fraction selected from the group consisting of 1) aromatic bifunctional phenols and carbonate donors; 2) aliphatic esters of carbonic acid or derivatives thereof, or aliphatic carboxylic acids or derivatives thereof and carbonate donors; and 3) mixtures thereof, wherein the ester component is at least 70% wt. % of the sum of the ester component and D;

c) the aliphatic or partially aromatic polyester amides are prepared by reacting as starting materials, an ester or a mixture thereof as described in (a) with an amide component selected from the group consisting of E) an amide fraction of an amine component selected from the group consisting of aliphatic bifunctional amines, cycloaliphatic bifunctional amines, and mixtures thereof; and optional small amounts of branched bifunctional amines, higher-functional amines or mixture thereof; and an acid component selected from the group consisting of linear bifunctional acids, cycloaliphatic bifunctional acids, aromatic bifunctional acids, and mixtures thereof; and optional small amounts of branched bifunctional acids, higher-functional acids, and mixtures thereof;

F) an amide fraction of compounds containing both amine and acid moieties; and mixtures thereof, wherein the ester component is at least 30 wt. % of the sum of the ester component and the amide component, and wherein all acids are optionally derivatized as moieties selected from the group consisting of acid chlorides, monomeric esters and oligomeric esters.

2. The adhesive according to claim 1, wherein the solvent is selected from the group consisting of alcohols, ketones, ethers, halogenated hydrocarbons, halogen-free hydrocarbons, esters and mixtures containing at least one of these solvents.

3. The adhesive according to claim 1, wherein the solvent is selected from the group consisting of acetone, ethyl acetate, isopropanol, methanol, dichloromethane, chloroform, tetrahydrofuran, ethanol, toluene and mixtures containing at least one of these solvents.

4. The adhesive according to claim 1, wherein the solvent is ethanol.

5. The adhesive according to claim 1 wherein the compostable biodegradable polymer, further comprises 0.1 to 5 wt. % branching agents selected from the group consisting of trifunctional alcohols, tetrafuctional alcohols and trifunctional carboxylic acids.

6. The adhesive according to claim 1 wherein the compostable biodegradable polymer, further comprises 0.1 to 5 wt. % branching agents selected from the group consisting of trimethylolpropane, glycerol, pentaerythritol, lysine, aminoethylaminoethanol and citric acid.

7. The adhesive according to claim 1 wherein the solution comprises 8 to 50 wt. % of compostable biodegradable polymer.

8. The adhesive according to claim 1 wherein the solution further comprises optional components selected from the group consisting of fillers, additives, bonding enhancers, viscosity influencing agents, crystallisation accelerators and mixtures thereof.

9. A process to adhesive bond a material comprising: applying a compostable water-resistant coating comprising 1 to 70 wt. % biodegradable polymers selected from the group consisting of aliphatic or partly aromatic polyesters, thermoplastic aliphatic or partly aromatic polyesterurethanes, aliphatic or aliphatic/aromatic polyestercarbonates and aliphatic or partly aromatic polyesteramides to the material; and evaporating the solvent.

10. The process according to claim 9, wherein the material is compostable.

11. The process according to claim 9 wherein the material is made from leather, ceramics, wood, cardboard, paper, plastics and mixtures thereof.

* * * * *